J. CHERVICTNAK.
ARMORED AUTOMOBILE.
APPLICATION FILED AUG. 21, 1918.
1,289,392.
Patented Dec. 31, 1918.
3 SHEETS—SHEET 1.
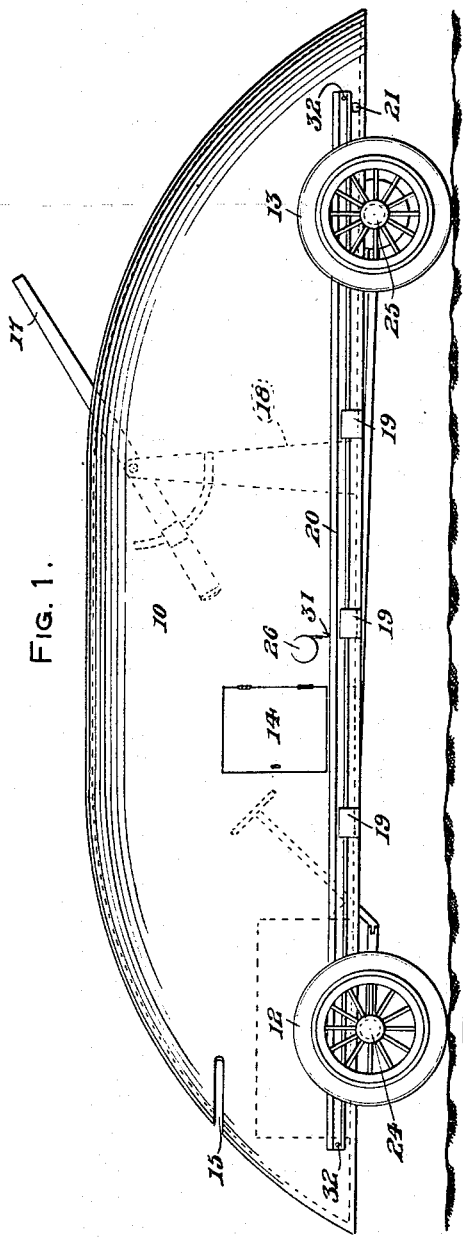
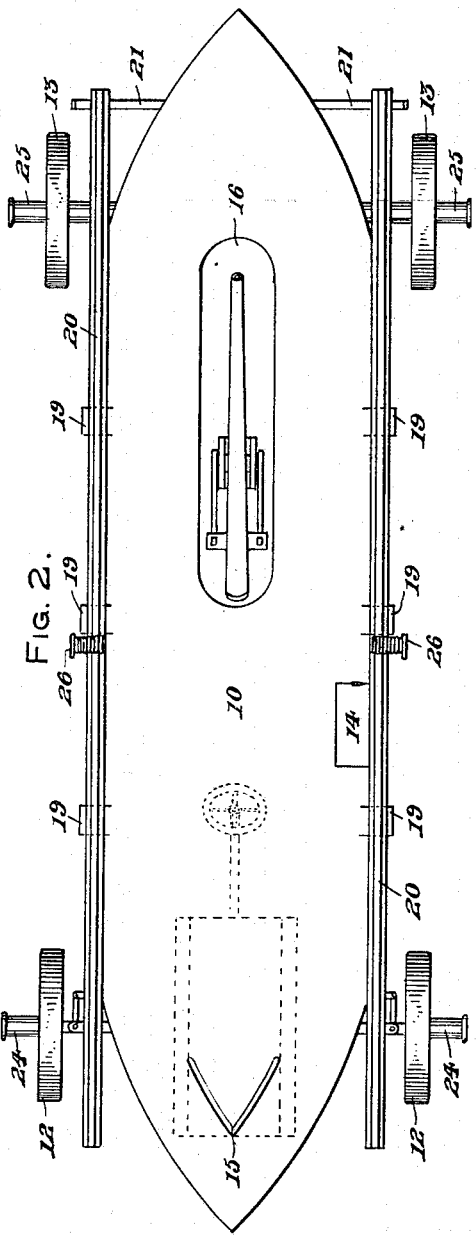
Inventor
J. Chervictnak
By A. M. Wilson
Attorney J. CHERVICTNAK.
ARMORED AUTOMOBILE.
APPLICATION FILED AUG. 21, 1918.
1,289,392.
Patented Dec. 31, 1918.
3 SHEETS—SHEET 2.
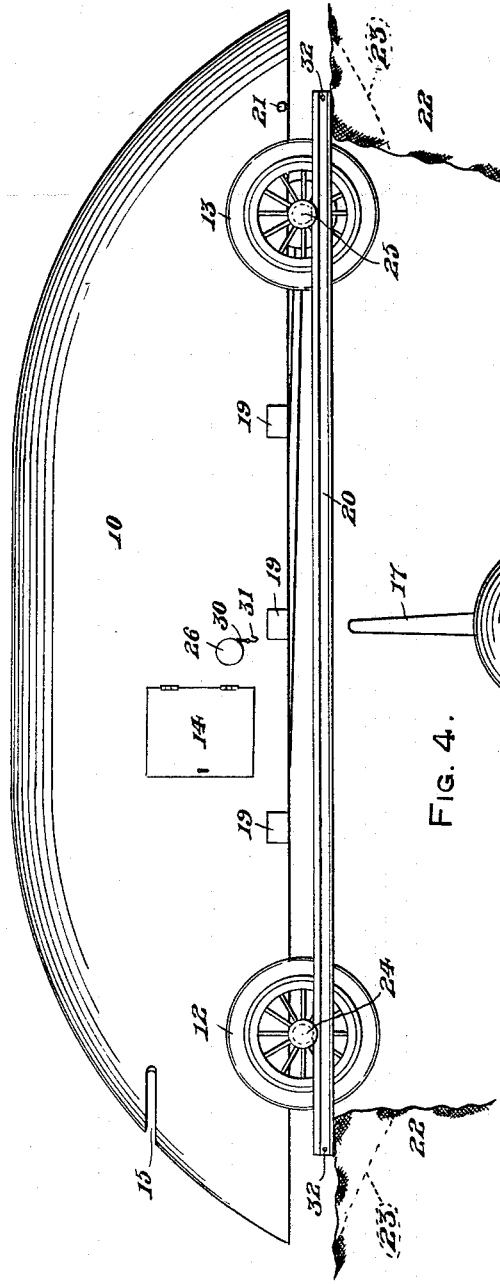
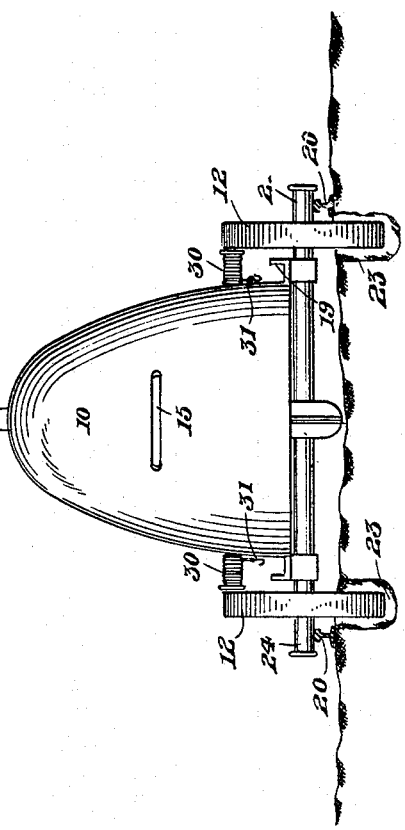
Inventor
J. Chervictnak
By A. M. Wilson
Attorney

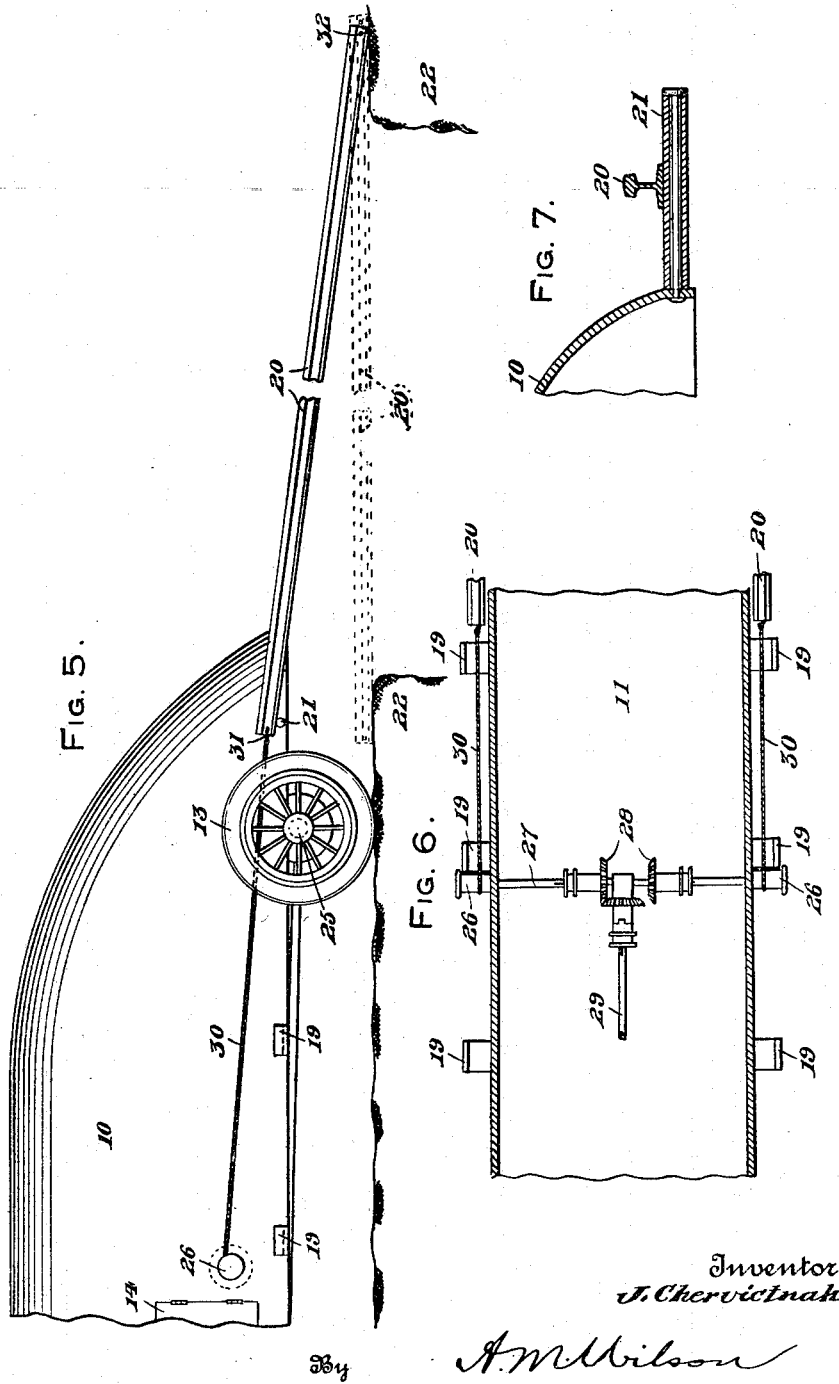

UNITED STATES PATENT OFFICE.

JOSEPH CHERVICTNAK, OF PLYMOUTH, PENNSYLVANIA.

ARMORED AUTOMOBILE.

1,289,392. Specification of Letters Patent. Patented Dec. 31, 1918.

Application filed August 21, 1918. Serial No. 250,794.

*To all whom it may concern:*

Be it known that I, JOSEPH CHERVICTNAK, subject of the Emperor of Austria, residing at Plymouth, in the county of Luzerne and State of Pennsylvania, have invented certain new and useful Improvements in Armored Automobiles, of which the following is a specification.

The primary object of the invention is the provision of an automobile adapted for army use whereby soldiers may fire upon the enemy from protected quarters, the vehicle being capable of traveling over the ground and over ditches and gullies of limited width.

A further object of the invention is the provision of an armored vehicle adapted for traveling over the ground and provided with a track for spanning depressions in the line of travel over which the vehicle may readily pass while provision is made for easily returning the track to its inoperative position upon the vehicle.

With these general objects in view, the invention consists of the combination of parts hereinafter fully described and illustrated in the accompanying drawings, in which like reference characters designate corresponding parts throughout the several views.

In the drawings:

Figure 1 is a side elevation of the invention;

Fig. 2 is a top plan view thereof;

Fig. 3 is a view similar to Fig. 1 showing the vehicle traveling over a ditch;

Fig. 4 is a front elevational view thereof with the track shown in vertical transverse section;

Fig. 5 is a side view of a rear portion of the device illustrating the manner of returning the track rails to their position upon the vehicle;

Fig. 6 is a horizontal transverse sectional view taken through a portion of the vehicle; and Fig. 7 is an enlarged vertical detail view of one of the rail supporting rollers carried by the vehicle.

My invention comprises an inverted boat-shaped body or casing 10 having a bottom or floor 11, front wheels 12 and rear wheels 13 being provided for supporting said body for traveling from place to place after the manner of an ordinary motor truck or car. The body 10 is formed of bullet-proof material and has a hinged door 14 at one side thereof, while a forwardly positioned slot 15 permits the driver of the vehicle to freely view the line of travel. An opening 16 is provided in the top of the body 10 through which an automobile air-craft gun 17 projects from a point within the body 10, the said gun having a suitable carriage 18 mounted upon the floor 11.

A plurality of L-shaped brackets 19 project at opposite points from the side of the car body 10 adapted for supporting a railway rail 20 at each side of the vehicle. The rails 20 are of any suitable length and may be pushed rearwardly over the brackets 19 and rollers 21 provided at opposite points adjacent the rear end of the body 10 for mounting the rails 20 in track formation upon the ground spanning ditch or chasm, as best illustrated in Figs. 3 and 5 of the drawings. When the rails 20 are positioned parallel with their ends resting upon the opposite banks 22 of the ditch, the vehicle may be caused to travel through depressions 23 formed in the opposite banks 22 for the reception of the wheels 12 and 13 so that the projecting spindles 24 and 25 carried by the wheels 12 and 13 respectively, are positioned upon the rails 20 for traveling thereover.

The vehicle being then positioned, as illustrated in Figs. 3 and 4 of the drawings, the rear wheels 13 are turned by the motor causing the car to travel over the rails 20 until the opposite bank of the ditch is reached by the wheels 12, which wheels are then passed through the depressions 23 at the forward end of the track and the rear wheels 13 will follow the same onto the ground at the forward end of the track for continuing the travel of the vehicle.

A winding drum 26 is provided at each side of the body 10 upon a shaft 27 carried by the body and having an operating gear 28 positioned within the body adapted to be turned by means of a power shaft 29. Cables 30 are adapted for winding upon the drums 26 and are provided with hooks 31 for engaging perforations 32 in the adjacent ends of the rails. Upon elevating the forward ends of the rails 20 upon the rollers 21 and turning the shaft 29 for revolving the drum 26 in the required direction, the cables 30 are wound upon the drums and the rails 20 drawn forwardly upon the brackets 19 and by the assistance of the operator, are positioned upon said brackets for carrying by the vehicle during the travel thereof. A serviceable armored automobile is provided capable of traveling over uneven ground as well as over ditches and trenches, whereby the transporting of troops with safety and the pursuit of the enemy is facilitated.

What I claim as new is:

1. A device of the class described, comprising an inverted boat-shaped body having a forward side opening and a discharge gun receiving opening, a door in the side of the body, wheels beneath the body upon which the vehicle is adapted to travel, outwardly projecting spindles carried by the wheels adapted for traveling upon a track, rail supporting brackets upon the opposite sides of the body, winding drums at the side of the body, and hoisting cables carried by the said drums whereby rails are adapted to be drawn forwardly upon said brackets.

2. A device of the class described, comprising an armored car, brackets projecting from the opposite sides of the car, opposite rollers adjacent one end of the car, winding drums outwardly projecting from the car, operating means for said drums positioned within the car, rails adapted for carrying upon said brackets and rollers when not in use and for spanning a ditch in track formation when in operation, traveling wheels for the car, outwardly projecting spindles carried by the said wheels adapted for traveling upon the rails when spanning a ditch, winding drums operatively carried by the car and hoisting cables attached to said drums and adapted for connection with the said rails for moving the rails over the rollers to their inoperative positions upon said brackets.

In testimony whereof I affix my signature.

JOSEPH $\overset{\text{his}}{\times}$ CHERVICTNAK.
mark

Witnesses to mark:
WM. E. SMITH,
WORYL KUENNA.

Copies of this patent may be obtained for five cents each, by addressing the "Commissioner of Patents Washington, D. C."